United States Patent
Russell

(10) Patent No.: US 11,780,376 B1
(45) Date of Patent: Oct. 10, 2023

(54) VEHICULAR SANITARY PRODUCT DISPENSER

(71) Applicant: Kate Russell, N Chesterfield, VA (US)

(72) Inventor: Kate Russell, N Chesterfield, VA (US)

( * ) Notice: Subject to any disclaimer, the term of this patent is extended or adjusted under 35 U.S.C. 154(b) by 359 days.

(21) Appl. No.: 17/189,365

(22) Filed: Mar. 2, 2021

(51) Int. Cl.
*B60R 7/08* (2006.01)
*B60R 11/00* (2006.01)

(52) U.S. Cl.
CPC ......... *B60R 7/08* (2013.01); *B60R 2011/0028* (2013.01); *B60R 2011/0045* (2013.01)

(58) Field of Classification Search
CPC .... B60R 7/08; B60R 7/00; B60R 7/04; B60R 7/084; B60R 7/088; B60R 2001/0028; B60R 2001/0042
USPC ....... 296/1.07, 37.7; 224/933, 0.5, 400, 277, 224/282, 567
See application file for complete search history.

(56) References Cited

U.S. PATENT DOCUMENTS

| | | | |
|---|---|---|---|
| 3,773,378 A | 11/1973 | Ewis | |
| 5,285,941 A * | 2/1994 | Herrera | B60R 7/04 224/314 |
| D461,403 S | 8/2002 | Chomik | |
| 6,578,731 B1 | 6/2003 | Ewis | |
| 9,758,101 B2 | 9/2017 | Chalupka | |
| 2006/0113810 A1 | 6/2006 | Kuhl | |
| 2011/0155766 A1 | 6/2011 | Huirley | |
| 2012/0248140 A1 | 10/2012 | Iseri | |

FOREIGN PATENT DOCUMENTS

| | | | | |
|---|---|---|---|---|
| DE | 10304511 A1 * | 8/2004 | ............ | B60R 11/00 |
| JP | 3388161 B2 * | 3/2003 | ............ | B60N 3/12 |
| JP | 2004175256 A * | 6/2004 | | |
| JP | 4141814 B2 * | 8/2008 | | |
| JP | 4264654 B2 * | 5/2009 | ............ | B60Q 3/225 |
| RU | 2703750 C2 * | 10/2019 | ............ | B60R 7/04 |
| WO | 2002041742 | 5/2002 | | |
| WO | WO-2006046333 A1 * | 5/2006 | ............ | B60Q 3/225 |
| WO | WO-2007008818 A2 * | 1/2007 | ............ | B60R 7/04 |

OTHER PUBLICATIONS

Translation of RU2703750 (Year: 2019).*

* cited by examiner

*Primary Examiner* — Dennis H Pedder
(74) *Attorney, Agent, or Firm* — Kyle A. Fletcher, Esq.

(57) ABSTRACT

The vehicular sanitary product dispenser comprises a storage structure, a compartment, and a vehicle. The vehicle further comprises a headliner. The compartment is formed in the headliner. The storage structure rotates into and out of the compartment. The storage structure forms a console used to store, dispense, and distribute personal protective products.

15 Claims, 5 Drawing Sheets

VEHICULAR SANITARY PRODUCT DISPENSER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles, more specifically, an arrangement for holding or mounting articles, not otherwise provided for. (B60R11/00)

SUMMARY OF INVENTION

The vehicular sanitary product dispenser comprises a storage structure, a compartment, and a vehicle. The vehicle further comprises a headliner. The compartment is formed in the headliner. The storage structure rotates into and out of the compartment. The storage structure forms a console used to store, dispense, and distribute personal protective products.

These together with additional objects, features and advantages of the vehicular sanitary product dispenser will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular sanitary product dispenser in detail, it is to be understood that the vehicular sanitary product dispenser is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular sanitary product dispenser.

It is therefore important that the claims be regarded as including such equivalent construction insofar as they do not depart from the spirit and scope of the vehicular sanitary product dispenser. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
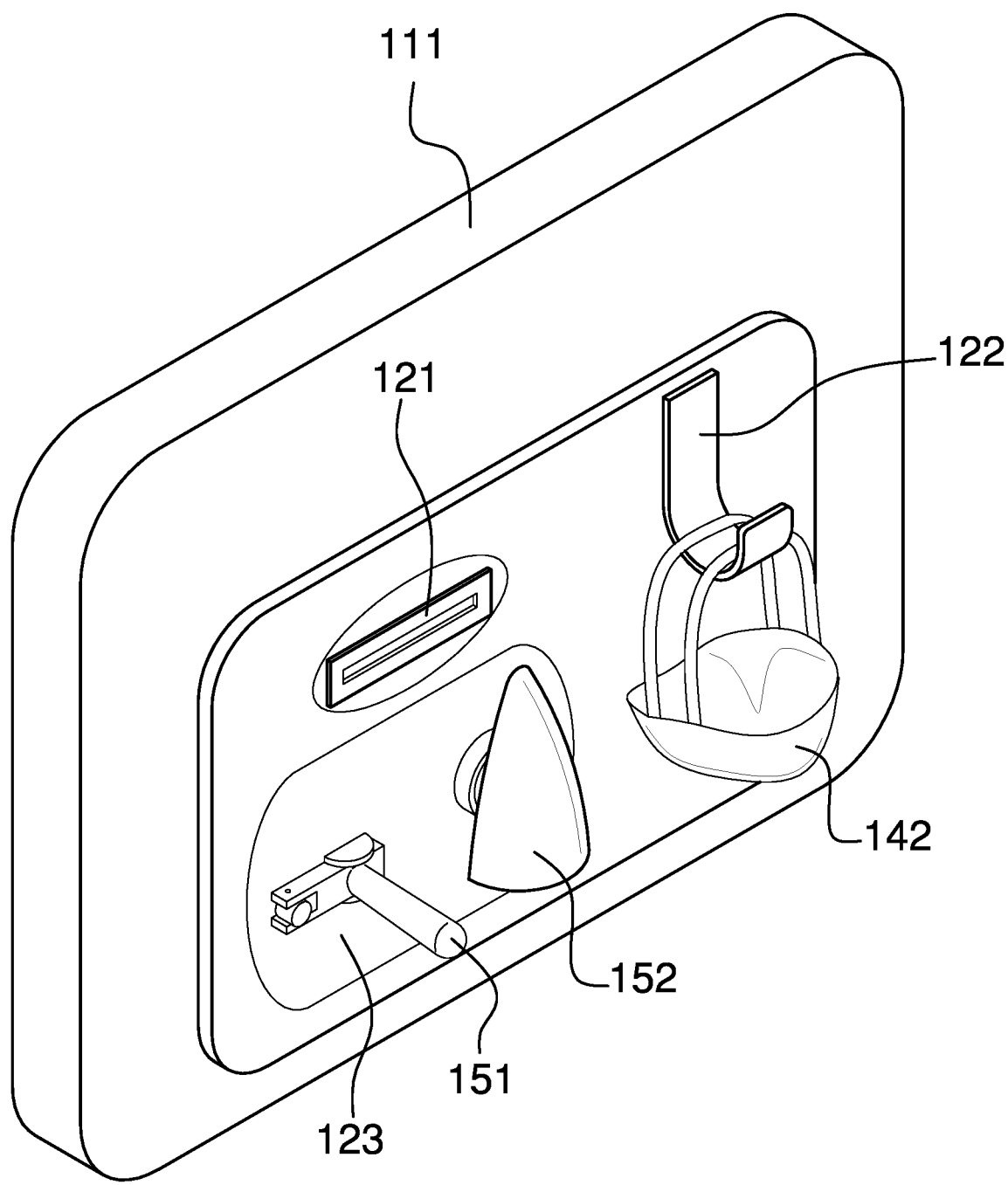
FIG. 1 is a perspective view of an embodiment of the disclosure.
Figure 2:
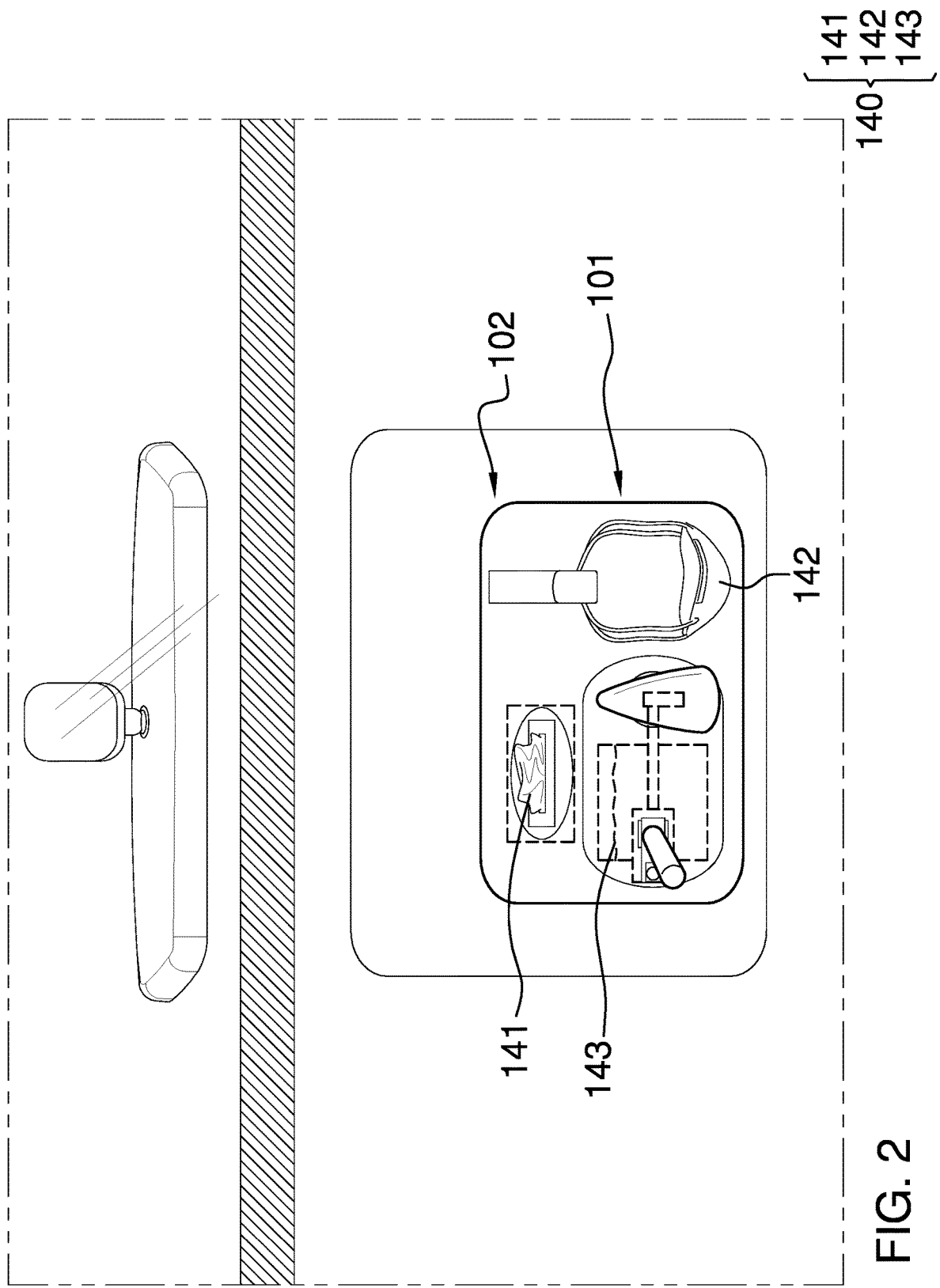
FIG. 2 is a top closed position view of an embodiment of the disclosure.
Figure 3:
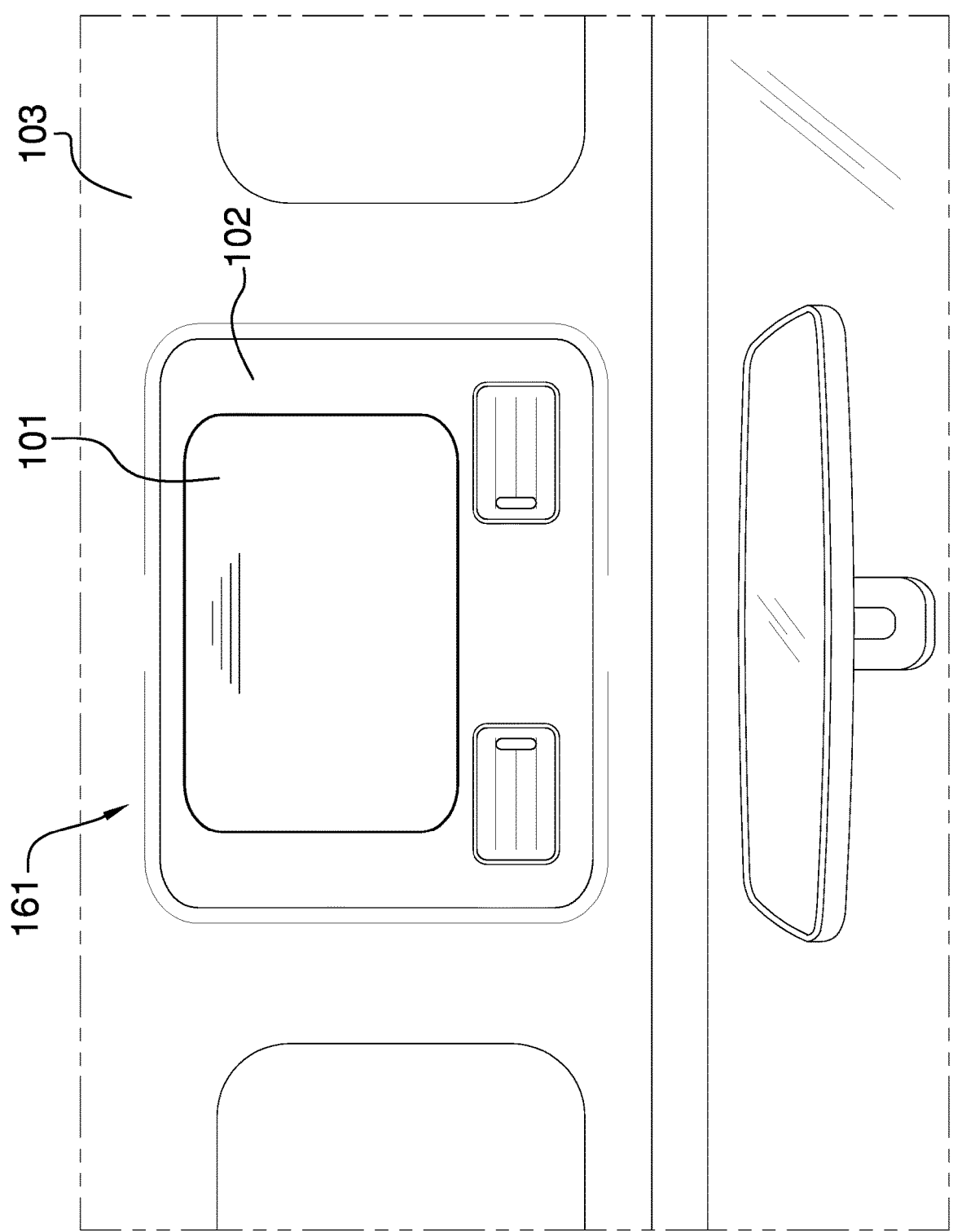
FIG. 3 is a bottom closed position view of an embodiment of the disclosure.
Figure 4:
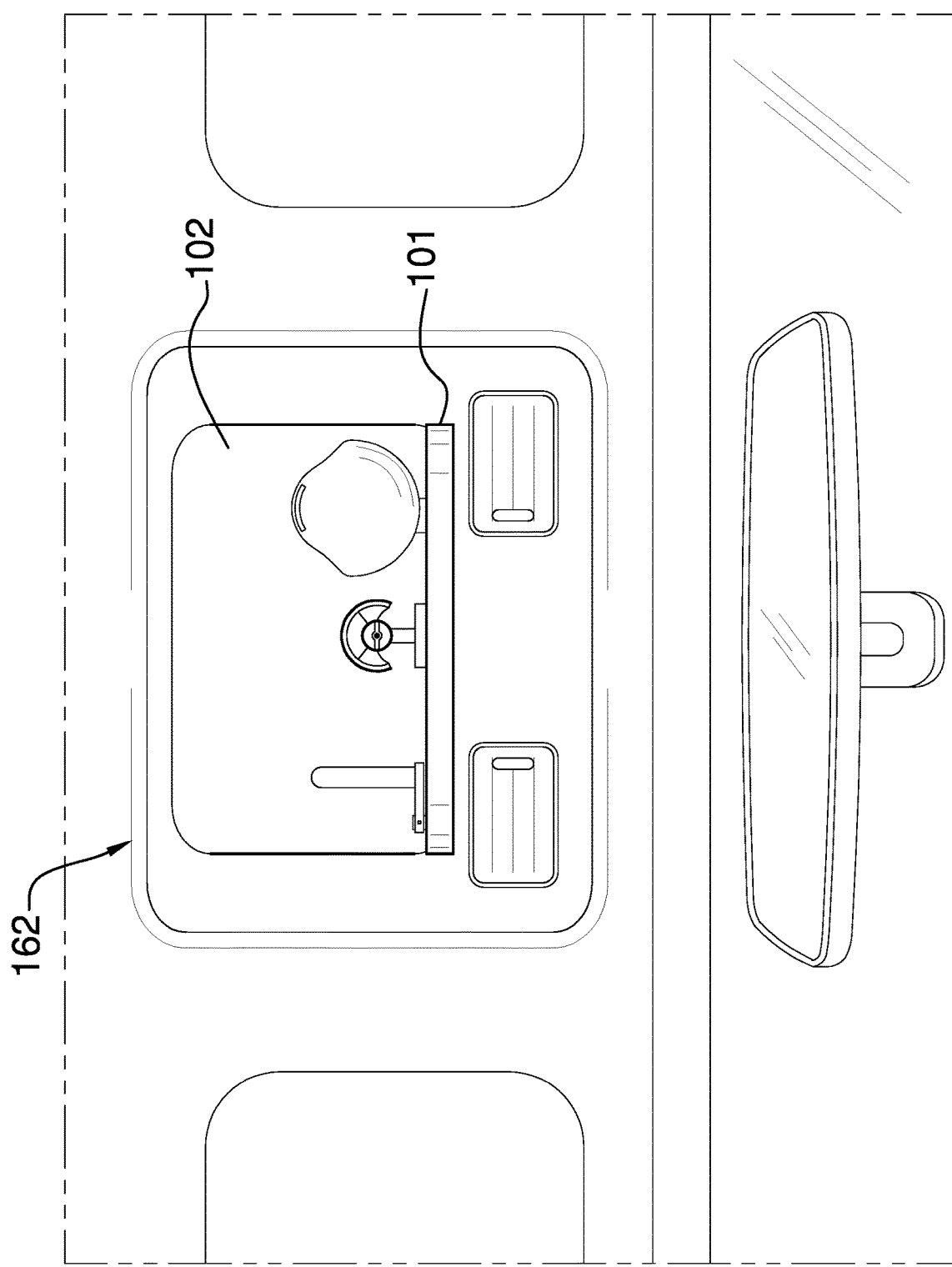
FIG. 4 is a bottom open position view of an embodiment of the disclosure.
Figure 5:
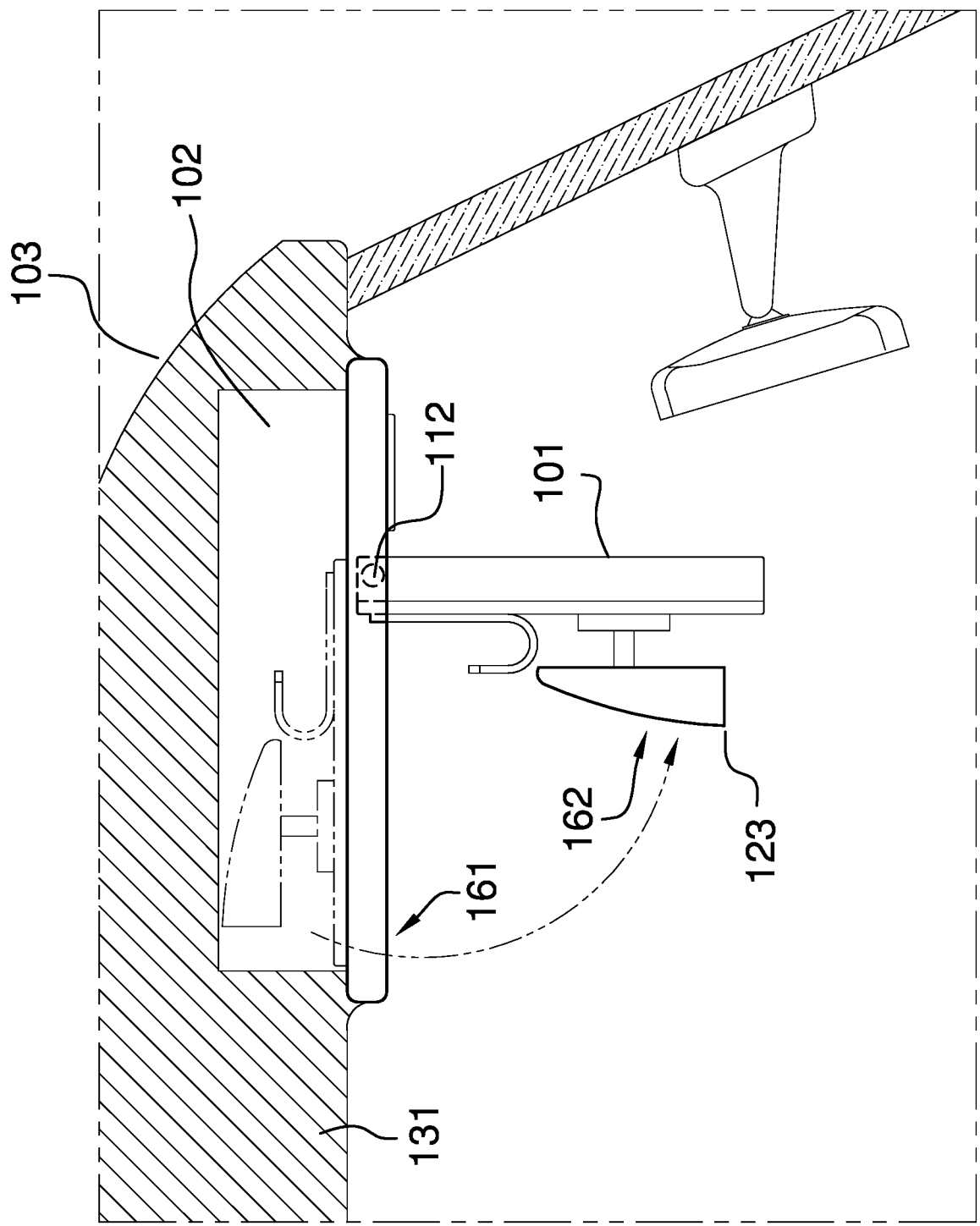
FIG. 5 is a side view of an embodiment of the disclosure.

Detailed reference will now be made to one or more potential embodiments of the disclosure, which are illustrated in FIGS. 1 through 5.

The vehicular sanitary product dispenser 100 (hereinafter invention) comprises a storage structure 101, a compartment 102, and a vehicle 103. The vehicle 103 further comprises a headliner 131. The compartment 102 is formed in the headliner 131. The storage structure 101 rotates into and out of the compartment 102. The storage structure 101 forms a console used to store, dispense, and distribute a plurality of personal protective products 140. The vehicle 103 is defined elsewhere in this disclosure. The headliner 131 is the interior surface of the roof of the vehicle 103. The roof and the headliner 131 are defined elsewhere in this disclosure.

The compartment 102 is a negative space. The compartment 102 is formed in the headliner 131 of the vehicle 103. The compartment 102 is geometrically similar to the storage plate 111 of the storage structure 101 such that the storage plate 111 rotates into and out of the compartment 102. The compartment 102 is a prism-shaped structure. The compartment 102 forms a cavity that contains the storage structure 101.

The storage structure 101 is a prism-shaped structure. The storage structure 101 is a disk-shaped structure. The storage structure 101 is a hollow structure. The storage structure 101 attaches to the compartment 102 such that the storage structure 101 rotates into the compartment 102 when the storage structure 101 moves into a closed position 161. The storage structure 101 attaches to the compartment 102 such that the storage structure 101 rotates out of the compartment 102 when the storage structure 101 moves into an open position 162.

The storage structure 101 forms the structure that stores and dispenses the plurality of personal protective products 140. The plurality of personal protective products 140 are accessible from the storage structure 101 when the storage structure 101 is rotated into the open position 162. The plurality of personal protective products 140 are not accessible from the storage structure 101 when the storage structure 101 is rotated into the closed position 161.

Each of the plurality of personal protective products 140 is a personal product that is used for personal hygiene. Each of the plurality of personal protective products 140 performs a function selected from the group consisting of: a) inhibiting the spread of a microorganism; and, b) disrupting the biochemical processes of a microorganism. In the first potential embodiment of the disclosure, the plurality of personal protective products 140 comprises a plurality of pre-moistened wipes 141, a mask 142, and a disinfectant 143.

Each of the plurality of pre-moistened wipes 141 is a pre-moistened wipe 141. The pre-moistened wipe 141 is defined elsewhere in this disclosure. Each of the plurality of pre-moistened wipes 141 are moistened with a chemical disinfectant.

The mask 142 is a filter structure that is worn over the mouth and nose. The mask 142 inhibits the ability of a microorganism to cause infection through inhalation. The mask 142 is defined elsewhere in this disclosure.

The disinfectant 143 is a chemical. The disinfectant 143 has a fluid phase. The disinfectant 143 is selected such that the disinfectant 143 will disrupt the biochemical processes of a microorganism. The disinfectant 143 is defined elsewhere in this disclosure.

The storage structure 101 comprises a storage plate 111 and a hinge 112. The hinge 112 secured the storage plate 111 to the compartment 102.

The hinge 112 is a fastening structure. The hinge 112 is a rotating structure. The hinge 112 attaches the storage plate 111 to the compartment 102 such that the storage plate 111 rotates relative to the compartment 102.

The storage plate 111 is a prism-shaped structure. The storage plate 111 is a disk-shaped structure. The storage plate 111 is a hollow structure. The storage plate 111 forms the physical structure of the storage structure 101 that rotates into and out of the compartment 102. The storage plate 111 forms the structure that stores and dispenses the plurality of personal protective products 140. The storage plate 111 is geometrically similar to the compartment 102 such that the storage plate 111 will rotate into and out of the compartment 102. The storage plate 111 provides access to the plurality of personal protective products 140 when the storage plate 111 is rotated into the open position 162. The storage plate 111 prevents access to the plurality of personal protective products 140 when the storage plate 111 is rotated into the closed position 161.

The storage plate 111 comprises a pre-moistened wipe 141 holder 121, a mask 142 hook 122, and a universal dispensing pump 123. The pre-moistened wipe 141 holder 121 stores and dispenses the plurality of pre-moistened wipes 141. The mask 142 hook 122 stores and dispenses the mask 142. The universal dispensing pump 123 stores and dispenses the disinfectant 143.

The pre-moistened wipe 141 holder 121 is a negative space. The pre-moistened wipe 141 holder 121 is a prism-shaped structure. The pre-moistened wipe 141 holder 121 has a pan shape. The pre-moistened wipe 141 holder 121 is formed in the storage plate 111 such that the open face of the pan structure of the pre-moistened wipe 141 holder 121 forms an aperture in a congruent end of the disk structure of the storage plate 111. The pre-moistened wipe 141 holder 121 stores the plurality of pre-moistened wipes 141. The pre-moistened wipe 141 holder 121 dispenses the plurality of pre-moistened wipes 141 through the open face of the pan structure of the pre-moistened wipe 141 holder 121.

The mask 142 hook 122 is a hook. The mask 142 hook 122 mounts on the congruent end of the disk structure of the storage plate 111 in which the aperture of the pre-moistened wipe 141 holder 121 is formed. The mask 142 hook 122 is a curved structure. The mask 142 hook 122 secures one or more masks 142 to the storage plate 111. The one or more masks 142 attach to the mask 142 hook 122 such that the one or more masks 142 are suspended from the mask 142 hook 122 when the storage structure 101 is rotated to the open position 162.

The universal dispensing pump 123 is a mechanical structure. The universal dispensing pump 123 mounts on the congruent end of the disk structure of the storage plate 111 in which the aperture of the pre-moistened wipe 141 holder 121 is formed. The universal dispensing pump 123 stores and dispenses a disinfectant 143 that can be used for cleaning purposes. The universal dispensing pump 123 is defined elsewhere in this disclosure. The universal dispensing pump 123 further comprises a lever 151 and a discharge nozzle 152.

The lever 151 is a mechanical structure. The lever 151 provides a mechanical advantage that is used to operate the pump mechanism of the universal dispensing pump 123. The lever 151 mounts on the congruent end of the disk structure of the pre-moistened wipe 141 holder 121 in which the aperture of the universal dispensing pump 123 is formed. The lever 151 is defined elsewhere in this disclosure.

The discharge nozzle 152 forms a port that discharges the disinfectant 143 from the universal dispensing pump 123. The discharge nozzle 152 mounts on the congruent end of the disk structure of the pre-moistened wipe 141 holder 121 in which the aperture of the universal dispensing pump 123 is formed. The nozzle is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Biochemistry: As used in this disclosure, biochemistry refers to the chemical substances and the chemical processes associated with biological processes.

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Chemical: As used in this disclosure, a chemical refers to a substance of a known or fixed composition. The term chemical is used to describe the substance when the details of the composition of the substance or properties of the substance are considered relevant to the disclosure at bar. The term properties is taken to mean both the measurable properties of the substance and the interactions of a first chemical with a second chemical. The term compound is considered a synonym for the term chemical. The term chemistry refers to the study and the use of the knowledge of the composition and properties of chemicals. The terms chemical reaction refers to the interactions between two or more chemical structures.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Cleaning Agent: As used in this disclosure, a cleaning agent is a chemical compound used to remove pathogens, dirt and detritus from a surface.

Cleaning Solution: As used in this disclosure, a cleaning solution is a chemical solution that contains a solvent used to dissolve a cleaning agent.

Closed Position: As used in this disclosure, a closed position refers to a rotating structure that is in an orientation that prevents access to the contents of the structure. The closed position is often referred to as an object being "closed." Always use orientation.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disinfectant: As used in this disclosure, a disinfectant is a chemical that destroys or inhibits the biochemical activities of pathogenic microorganisms.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Latch: As used in this disclosure, a latch is a fastening or locking mechanism. The use of the term latch does not necessarily but often implies the insertion of an object into a notch or cavity.

Lever: As used in this disclosure, a lever is a simple machine that comprises a shaft that rotates around a fulcrum, axis of rotation, or pivot point.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Mask: As used in this disclosure, a mask is a covering for the face of a person. A mask filters air as it passes through the nose and mouth of a patient.

Microorganism: As used in this disclosure, a microorganism is an organism too small to be viewed by the unaided eye. Microorganisms are typically single celled organisms such as bacteria, yeast, viruses, protozoa, fungi and algae. A pathogen refers to a microorganism that has the potential to cause illness or disease.

Negative Space: As used in this disclosure, negative space is a method of defining an object through the use of open or empty space as the definition of the object itself, or, through the use of open or empty space to describe the boundaries of an object.

Nozzle: As used in this disclosure, a nozzle is a device that receives fluid under pressure and releases the fluid in a controlled manner into an environment.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a rotating structure that is in an orientation that allows access to the contents of the structure. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pivot: As used in this disclosure, a pivot is a rod or shaft around which an object rotates or swings.

Poison: As used in this disclosure, a poison is a chemical substance that interferes with the normal biological processes of a biological organism. The term poison often implies the injury to or death of the biological organism. A toxin is a poison that generates an immune system response.

Port: As used in this disclosure, a port is an aperture formed in an object that allows fluid to flow through the boundary of the object.

Pre-Moistened Wipe: As used in this disclosure, a pre-moistened wipe is a paper or textile is that previously moistened and that is used for cleaning purposes. By previously moistened is meant that the paper or textile is moistened before the pre-moistened wipe is packaged for storage. These previously moistened papers or textiles will remain moist until subsequent accessed. The previously moistened paper or textile can be individually wrapped for storage or can be stored in bulk. Pre-moistened wipe are commonly referred to a baby wipes or wet wipes.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Roof: As used in this disclosure, a roof refers to the superior surface of a hollow structure. The roof typically encloses the hollow structure. The interior surface of the roof of a vehicle is often called a headliner.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Simple Machine: As used in this disclosure, a simple machine refers to a device that consists of a mechanism selected from the group consisting of: 1) an inclined plane, 2) a lever; 3) a pivot, 4) a pulley, 5) a screw, 6) a spring, 7) a wedge, and 8) a wheel (including axles). A compound machine is a device that consists of a plurality of mechanisms selected from the group consisting of the simple machine.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Suspend: As used in this disclosure, to suspend an object means to support an object such that the inferior end of the object does not form a significant portion of the load path of the object.

Universal Dispenser Pump: As used in this disclosure, a universal dispenser pump is a pump that is used to pump a liquid out of a bottle. The universal dispenser pump is a well-known and documented commercially available product that is often referred to as a soap pump or a shampoo pump.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wipe: As used in this disclosure, the verb wipe refers to rubbing a surface with an object. When a sheeting is used as the object wiping the surface, the sheeting is often referred to as a "wipe."

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. The vehicular sanitary product dispenser comprising
a storage structure, a compartment, and a vehicle;
wherein the vehicle further comprises a headliner;
wherein the compartment is formed in the headliner;
wherein the storage structure rotates into and out of the compartment;
wherein the storage structure forms a console used to store, dispense, and distribute a plurality of personal protective products;
wherein the storage structure comprises a storage plate and a hinge;
wherein the storage plate comprises a pre-moistened wipe holder, a mask hook, and a universal dispensing pump;
wherein the pre-moistened wipe holder stores and dispenses a plurality of pre-moistened wipes;
wherein the mask hook stores and dispenses the mask;
wherein the universal dispensing pump stores and dispenses a disinfectant.

2. The vehicular sanitary product dispenser according to claim 1
wherein the compartment is a negative space;
wherein the compartment is formed in the headliner of the vehicle;
wherein the compartment forms a cavity that contains the storage structure.

3. The vehicular sanitary product dispenser according to claim 2
wherein the compartment is geometrically similar to the storage structure.

4. The vehicular sanitary product dispenser according to claim 3
wherein the storage structure is a disk-shaped structure;
wherein the storage structure is a hollow structure;
wherein the storage structure rotates into the compartment when the storage structure moves into a closed position;
wherein the storage structure rotates out of the compartment when the storage structure moves into an open position.

5. The vehicular sanitary product dispenser according to claim 4
wherein the plurality of personal protective products are accessible from the storage structure when the storage structure is rotated into the open position;
wherein the plurality of personal protective products are not accessible from the storage structure when the storage structure is rotated into the closed position.

6. The vehicular sanitary product dispenser according to claim 5
wherein each of the plurality of personal protective products is a personal product that is used for personal hygiene;
wherein each of the plurality of personal protective products performs a function selected from the group consisting of: a) inhibiting the spread of a microorganism; and, b) disrupting the biochemical processes of a microorganism.

7. The vehicular sanitary product dispenser according to claim 6
wherein the hinge secures the storage plate to the compartment.

8. The vehicular sanitary product dispenser according to claim 7
wherein the hinge attaches the storage plate to the compartment such that the storage plate rotates relative to the compartment.

9. The vehicular sanitary product dispenser according to claim 8
wherein the storage plate is a disk-shaped structure;
wherein the storage plate is a hollow structure;
wherein the storage plate is geometrically similar to the compartment such that the storage plate will rotate into and out of the compartment.

10. The vehicular sanitary product dispenser according to claim 9
wherein the storage plate forms the structure that stores and dispenses the plurality of personal protective products;
wherein the storage plate provides access to the plurality of personal protective products when the storage plate is rotated into the open position;
wherein the storage plate prevents access to the plurality of personal protective products when the storage plate is rotated into the closed position.

11. The vehicular sanitary product dispenser according to claim 10
wherein each of the plurality of pre-moistened wipes are moistened with a chemical disinfectant;
wherein the mask is a filter structure that is worn over the mouth and nose;
wherein the mask inhibits the ability of a microorganism to cause infection through inhalation;
wherein the disinfectant is a chemical;
wherein the disinfectant has a fluid phase;
wherein the disinfectant is selected such that the disinfectant will disrupt the biochemical processes of a microorganism.

12. The vehicular sanitary product dispenser according to claim 11 wherein the pre-moistened wipe holder is a negative space;

wherein the pre-moistened wipe holder has a pan shape;

wherein the pre-moistened wipe holder is formed in the storage plate such that the open face of the pan structure of the pre-moistened wipe holder forms an aperture in a congruent end of the disk structure of the storage plate;

wherein the pre-moistened wipe holder stores the plurality of pre-moistened wipes;

wherein the pre-moistened wipe holder dispenses the plurality of pre-moistened wipes through the open face of the pan structure of the pre-moistened wipe holder.

13. The vehicular sanitary product dispenser according to claim 12 wherein the mask hook mounts on the congruent end of the disk structure of the storage plate in which the aperture of the pre-moistened wipe holder is formed;

wherein the mask hook is a curved structure;

wherein the mask hook secures one or more masks to the storage plate;

wherein the one or more masks attach to the mask hook such that the one or more masks are suspended from the mask hook when the storage structure is rotated to the open position.

14. The vehicular sanitary product dispenser according to claim 13 wherein the universal dispensing pump is a mechanical structure;

wherein the universal dispensing pump mounts on the congruent end of the disk structure of the storage plate in which the aperture of the pre-moistened wipe holder is formed;

wherein the universal dispensing pump stores and dispenses a disinfectant.

15. The vehicular sanitary product dispenser according to claim 14 wherein the universal dispensing pump further comprises a lever and a discharge nozzle;

wherein the lever is a mechanical structure;

wherein the lever provides a mechanical advantage that is used to operate the pump mechanism of the universal dispensing pump;

wherein the lever mounts on the congruent end of the disk structure of the pre-moistened wipe holder in which the aperture of the universal dispensing pump is formed;

wherein the discharge nozzle forms a port that discharges the disinfectant from the universal dispensing pump;

wherein the discharge nozzle mounts on the congruent end of the disk structure of the pre-moistened wipe holder in which the aperture of the universal dispensing pump is formed.

* * * * *